(12) United States Patent
Sitabkhan et al.

(10) Patent No.: US 6,489,393 B1
(45) Date of Patent: Dec. 3, 2002

(54) SURFACE TINTING COMPOSITION AND METHOD OF USE

(75) Inventors: Arif M. Sitabkhan, Westlake; Bart L. Ivic, Columbia Station, both of OH (US); Michael W. Howe, The Woodlands, TX (US)

(73) Assignee: Pennzoil-Quaker State Company, Houston, TX (US)

( * ) Notice: Subject to any disclaimer, the term of this patent is extended or adjusted under 35 U.S.C. 154(b) by 20 days.

(21) Appl. No.: 09/695,177

(22) Filed: Oct. 24, 2000

(51) Int. Cl.⁷ ............................................... C08L 83/04
(52) U.S. Cl. .................... 524/588; 427/372.2; 524/449; 524/497; 524/445; 524/81; 524/800; 524/806; 524/492; 524/431; 524/422; 524/479; 524/31; 152/151
(58) Field of Search ........................ 427/372.2; 524/449, 524/437, 445, 81, 588, 800, 806, 492, 431, 442, 31; 525/479; 152/151

(56) References Cited

U.S. PATENT DOCUMENTS

| | | |
|---|---|---|
| 3,976,497 A | 8/1976 | Clark |
| 4,224,268 A | 9/1980 | Merli et al. .................. 264/139 |
| 4,237,173 A | 12/1980 | Kuan .......................... 428/65 |
| 4,279,286 A | 7/1981 | Merli et al. ................ 152/353 |
| 4,325,852 A | 4/1982 | Hallenbeck ................ 523/334 |
| 4,548,980 A | 10/1985 | Nagata et al. .............. 524/495 |
| 4,550,135 A | 10/1985 | Iwama et al. ............... 524/495 |
| 4,908,401 A | 3/1990 | Ohara et al. ................ 524/495 |
| 4,967,818 A | 11/1990 | Gartland et al. ............ 152/524 |
| 4,967,819 A | 11/1990 | Kansupada ................. 152/524 |
| 4,973,463 A | 11/1990 | Nakai .......................... 723/445 |
| 5,049,220 A | 9/1991 | Gartland et al. ............ 156/116 |
| 5,058,647 A | 10/1991 | Gartland et al. ............ 152/524 |
| 5,059,408 A | 10/1991 | Mito .......................... 423/445 |
| 5,137,070 A | 8/1992 | Kansupada et al. ......... 152/524 |
| 5,160,383 A | 11/1992 | Gartland et al. ............ 152/510 |
| 5,240,056 A | 8/1993 | Kansupada et al. ......... 152/524 |
| 5,263,525 A | 11/1993 | Yamashita .................. 152/523 |
| 5,277,742 A | 1/1994 | Scheurer ..................... 156/397 |
| 5,340,394 A | 8/1994 | Elsamanoudi |
| 5,393,821 A | 2/1995 | Shieh et al. ................. 524/495 |
| 5,484,836 A | 1/1996 | Kikuchi et al. ............. 524/495 |
| 5,709,918 A | 1/1998 | Kimijima et al. .......... 428/40.1 |
| 5,738,813 A | 4/1998 | Naganawa et al. ......... 264/130 |
| 5,807,918 A | 9/1998 | Carter ........................ 524/495 |
| 5,824,397 A | 10/1998 | Koops et al. ............... 428/207 |
| 5,837,076 A | 11/1998 | Huber et al. ................ 152/524 |
| 5,840,138 A | 11/1998 | Majumdar et al. .......... 152/524 |
| 5,964,969 A | 10/1999 | Sandstrom et al. ......... 152/524 |
| 5,985,978 A | 11/1999 | Kikuchi et al. ............. 524/495 |
| 5,985,987 A | 11/1999 | Adolfsson et al. |
| 6,093,271 A | 7/2000 | Majumdar .................. 156/116 |
| 6,287,377 B1 * | 9/2001 | Binns et al. |

FOREIGN PATENT DOCUMENTS

| | | |
|---|---|---|
| GB | 858072 | 1/1961 |
| JP | 11222577 A2 | 8/1999 |

OTHER PUBLICATIONS

Search Report, Jun. 28. 2001.

* cited by examiner

*Primary Examiner*—Robert Dawson
*Assistant Examiner*—Kim-Liang Peng
(74) *Attorney, Agent, or Firm*—Jenkens & Gilchrist

(57) ABSTRACT

A tinting composition for tinting a surface which includes a solvent and a pigment selected from the group consisting of titanium dioxide, mica, and mixtures thereof.

4 Claims, No Drawings

SURFACE TINTING COMPOSITION AND METHOD OF USE

FIELD OF THE INVENTION

This invention relates to a composition for tinting surfaces and methods of using the composition. More particularly, the invention relates to a composition for tinting polymeric substrates such as rubber, engineered plastics, and vinyl, metals, glass, fiberglass, paint, and plastics and methods of using the composition.

BACKGROUND OF THE INVENTION

Increasingly, consumers are expending money on accessories for their vehicles. Consumers often wish to modify the surface color of accessories used on or inside their vehicle to either coordinate or contrast that accessory with other parts of their vehicle or to accentuate that color. Examples of accessories that consumers may wish to modify in color to coordinate or contrast with other parts of their vehicle or to accentuate include, but are not limited to, polymeric substrates such as rubber, engineered plastic, and vinyl accessories, metal accessories, glass accessories, fiberglass accessories, painted accessories, and plastic accessories.

Examples of polymeric substrates such as rubber and vinyl accessories on vehicles that consumers may wish to modify in color include, but are not limited to, tires, dashboards, bumpers, seats, steering wheels, and mudflaps. Engineered plastic accessories on vehicles that consumers may wish to modify in color include, but are not limited to, bumpers, body panels, trim, and consoles. Metal accessories on vehicles that consumers may wish to modify in color include, but are not limited to, bumpers, rims, grills and hitches. Also, glass accessories on vehicles that consumers may wish to modify in color include, but are not limited to, windshields and mirrors. Certain fiberglass accessories on vehicles that consumers may wish to modify in color include, but are not limited to, body panels. Painted accessories on vehicles that consumers may wish to modify in color include, but are not limited to, exterior vehicle paint. Certain plastic accessories on vehicles that consumers may wish to modify in color include, but are not limited to, bumpers, headlights, and mirror casings.

Although consumers may wish to alter the surface color of the accessories used on or inside their vehicles to coordinate or contrast that color with other parts of their vehicle or to accentuate that color, often times consumers only desire to make the color change on a temporary, nonpermanent basis. Accordingly, a need exists for a tinting composition which consumers can safely handle and apply to accessories on or inside their vehicles or other surfaces not necessarily associated with vehicles to temporarily impart a color of their choice to the surface of the accessory.

SUMMARY OF THE INVENTION

The above need is met by embodiments of the invention in one or more of the following aspects. In one aspect, the invention relates to a tinting composition for tinting a surface. The composition includes a solvent and a pigment selected from the group consisting of iron oxide, titanium dioxide, mica, calcium sodium borosilicate, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, and mixtures thereof. The solvent selected for use in the tinting composition is selected from a wide range of solvents including branched or straight chained aliphatic hydrocarbons, synthetic hydrocarbons, alcohols, water, organic solvents, silicone fluids, paraffinic solvents, volatile solvents, and mixtures thereof.

In another aspect, the invention relates to a method of tinting a surface. The method includes selecting a surface for tinting; mixing a solvent and a pigment to form a tinting composition; and applying the tinting composition to the surface. The tinting composition includes a solvent and a pigment selected from the group consisting of iron oxide, titanium dioxide, mica, calcium sodium borosilicate, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, and mixtures thereof. The solvent selected for use in the tinting composition is selected from a wide range of solvents including branched or straight chained aliphatic hydrocarbons, synthetic hydrocarbons, alcohols, water, organic solvents, silicone fluids, paraffinic solvents, volatile solvents, and mixtures thereof.

Additional aspects of the invention and advantages provided by the embodiments of the invention are apparent with the following description.

DESCRIPTION OF EMBODIMENTS OF THE INVENTION

Embodiments of the invention provide a new tinting composition that is capable of temporarily tinting a surface. Although examples are directed to vehicles and vehicle accessories, other surfaces can be tinted using this invention. Examples of suitable surfaces which can be tinted by the tinting composition include, but are not limited to, polymeric substrates such as rubber, engineered plastics, and vinyl, metal, glass, fiberglass, painted surfaces, and plastic surfaces. The tinting composition includes a solvent and a pigment. The solvent is selected from the group consisting of branched or straight chained aliphatic hydrocarbons, synthetic hydrocarbons, alcohols, water, organic solvents, silicone fluids, paraffinic solvents, volatile solvents, and mixtures thereof. The pigment is selected from the group consisting of iron oxide, titanium dioxide, mica, calcium sodium borosilicate, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

Embodiments of the invention also provide a new method of tinting a surface. The method includes selecting a surface for tinting, mixing a solvent and a pigment to form a tinting composition, and applying the tinting composition to the surface and optionally includes the step of drying the tinting composition. The solvent is selected from the group consisting of branched or straight chained aliphatic hydrocarbons, synthetic hydrocarbons, alcohols, water, organic solvents, silicone fluids, paraffinic solvents, volatile solvents, and mixtures thereof. The pigment is selected from the group consisting of iron oxide, titanium dioxide, mica, calcium sodium borosilicate, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, or mixtures thereof.

When applied to the surface, the tinting composition is liquid in form. The tinting composition can be applied in various manners to the surface. It is contemplated that the tinting composition may be applied to the surface by spraying the tinting composition onto the surface with a spray trigger or an aerosol can; by sponging, dabbing, painting, or wiping the tinting composition onto the surface with a cloth, brush, sponge, pen, marker, or similar application means; by applying an adhesive which contains the tinting composition to the surface and then removing the adhesive; or by any other suitable means for applying the tinting composition to the surface. Once the tinting composition has been applied to the surface, the tinting composition dries and imparts a color and sheen to the surface. The drying time depends upon the length of time required for the solvent in the tinting composition to evaporate and is affected by the ventilation and the ambient conditions such as the humidity level and the temperature. The drying time can vary from about 10 minutes to about an hour depending on the ambient conditions and the solvent selected. The drying can be accomplished by allowing the tinting composition to be exposed to the ambient conditions or by applying heat to the tinting composition.

Once the tinting composition has been applied to the surface, the composition will remain on the surface for days to months. The length of time that the tinting composition remains on the surface depends upon a variety of conditions such as the ambient and environmental conditions, the amount of tinting composition which has been applied to the surface, the driving conditions to which the tinting composition is subjected, and the amount of abrasion to which the tinting composition is subjected. The tinting composition will eventually fade and/or peel and will need to be reapplied to the surface should the consumer wish to again impart a tint to the surface. Should the consumer desire to remove the tinting composition from the surface before it fades and/or peels, one can use a cleaning solution and optionally a brush to remove the tinting composition.

The selection of the solvent for use in the tinting composition depends on a variety of factors such as the desired drying time of the tinting composition, the flowability of the tinting composition, the desired degree of dispersing of the pigment in the tinting composition, and environmental considerations. Generally, the solvent is present in the tinting composition in an amount from about 0.1 to about 99.9 wt. % of the tinting composition. In certain embodiments, the solvent is present in an amount from about 50 to about 99.9 wt. % of the tinting composition. In certain other embodiments, the solvent is present in an amount from about 75 to about 99.9 wt. % of the tinting composition.

Examples of suitable solvents for use in the tinting composition include, but are not limited to, branched or straight chained aliphatic hydrocarbons, synthetic hydrocarbons, alcohols, water, organic solvents, silicone fluids, paraffinic solvents, volatile solvents, and mixtures thereof. Examples of suitable branched or straight chained aliphatic hydrocarbons include, but are not limited to, Shell Sol 71 and Shell Sol 142HT made by Shell Chemical Company, 2251 Oil made by Penreco, and Conosol® C145 made by Penreco. Examples of suitable synthetic hydrocarbons include, but are not limited to, synthetic isoparaffinic hydrocarbons such as Isopar® M made by ExxonMobil Chemical Company. Examples of suitable alcohols include, but are not limited to, ethanols and tert-butyl alcohols. Examples of suitable organic solvents include acetone, hexane, toluene, esters, volatile aldehydes, and volatile ketones. Examples of suitable silicone fluids include, but are not limited to, polydimethylsiloxane, functional silicone polymers, silicone resins, volatile silicones, and silanes. Examples of suitable functional silicone polymers include, but are not limited to, silicones containing amine functional groups, fluorinated functional groups, hydroxy terminated functional groups, cyclic functional groups, vinyl functional groups, and ethoxy functional groups. Where silicone fluids are used as the solvent in the tinting composition, the preferred viscosity range is from about 0.65 to about 12,000,000 cst. Examples of suitable paraffinic solvents include, but are not limited to, Isopar® M made by ExxonMobil Chemical Company. Examples of suitable volatile solvents include, but are not limited to, cyclic silicones, acetone, and mineral spirits.

In certain embodiments, the solvent used in the tinting composition is a mixture of straight and branched chain hydrocarbons and a polydimethylsiloxane. In some embodiments, the solvent used in the tinting composition is a mixture of straight and branched chain hydrocarbons and a mixture of polydimethylsiloxanes. In certain embodiments, the solvent used in the tinting composition is a mixture of straight and branched chain hydrocarbons and a mixture of polydimethylsiloxanes having varying viscosities. In one such embodiment, a mixture of polydimethylsiloxanes having viscosities of 50 cst, 100,000 cst, and 8,000,000–12,000,000 cst is used. In other such embodiments, a mixture of polydimethylsiloxanes having an overall viscosity of 50,000–60,000 cst is used. In other embodiments, the solvent used in the tinting composition is a straight chain hydrocarbon, a branched chain hydrocarbon, or a polydimethylsiloxane.

Suitable pigments for use in preparing the tinting composition include, but are not limited to, iron oxide, titanium dioxide, mica, calcium sodium borosilicate, organic constituent containing pigments, inorganic constituent containing pigments, fluorescent constituent containing pigments, phosphorescent constituent containing pigments, luminescent constituent containing pigments, ultraviolet absorbing pigments, mineral constituent containing pigments, amorphous glass oxides, polyacrylates, metal flakes, reflective pigments, and mixtures thereof. The selection of the pigment coloration also varies based upon the color choice and intensity of color one wishes to be able to impart onto the surface. In certain embodiments, the pigment is an inorganic constituent containing pigment. A preferred pigment is mica coated with titanium dioxide or iron oxide such as Mearlin® Hi-Lite Sparkle Green, Mearlin® Hi-Lite Sparkle Blue, Mearlin® Hi-Lite Sparkle Gold, Mearlin® Hi-Lite Sparkle Red, Mearlin® Sparkle Russet, Exterior Mearlin® Sparkle, Mearlin® Sparkle Brass, Mearlin® Sparkle Bronze, Mearlin® Sparkle Copper, Mearlin® Hi-Lite Super Green, Mearlin® Hi-Lite Super Blue, Mearlin® Hi-Lite Super Red, Mearlin® Plum, Mearlin® Kiwi Green, Mearlin® Adobe Green, Mearlin® Firemist Red, and Mearlin® Firemist Blue made by Engelhard Corporation, Microlith Yellow made by Ciba Specialty Chemicals, and Helicon® HC made by Wacker. Additional pigments include, but are not limited to, pigments sold by Engelhard Corporation such as the Mearlin® Magnapearls & White Pearlescents, the Mearlin® White Pearlescents, the Mearlin® Hi-Lite Interference Colors, the Mearlin® Dynacolor Luster Pigments, the Mearlin® "Non-Metallic" Metallic Colors, the Mearlin® Santa Fe Colors, the Mearlin® Micro Pearls, the Mearlin® Sparkle Colors, the Mearlite® Industrial Grades, the Mearlin® Firemist pigments, and the Mearlin® Vegetable Colors.

Generally, the pigment is present in the tinting composition in an amount from about 0.001 to about 60 wt. % of the tinting composition. In certain embodiments, the pigment is present in an amount from about 0.1 to about 50 wt. % of the tinting composition. In certain other embodiments, the pigment is present in an amount from about 0.1 to about 25 wt. % of the tinting composition.

In addition to a solvent and a pigment, the tinting composition may further include one or more of the following components: silica, an emulsifier, fragrance, an ultraviolet additive, and other additives to add or enhance the desired properties of the tinting composition. The use of these optional components and the desired amounts of each component is based upon the desired properties of the tinting composition such as the degree of coloration and the viscosity of the tinting composition; the shelf life of the tinting composition; the desired scent of the tinting composition; and the means used to apply the tinting composition to the surface.

In some embodiments, silica is added to the tinting composition to aid in suspending the pigment within the tinting composition. The silica that is selected for use in the tinting composition can be used either alone or in combination in varying proportions with other silica. Examples of suitable silica which can be used in the present invention include, but are not limited to, fumed silica such as Aerosil® R202 made by Degussa-Hüls and CAB-O-SIL® TS720 made by Cabot Corporation, amide powder, rheology additives, clays, surfactants, cellulose gums, carbomers, precipitated silica such as Zeothix 265 made by J.M. Huber Corporation, and mixtures thereof although other silica may also be used. A preferred silica used in embodiments of the invention is fumed silica. Generally, silica is present in the tinting composition in an amount from about 0.001 to about 30 wt. % of the tinting composition. In certain embodiments, the silica is present in an amount from about 0.01 to about 15 wt. % of the tinting composition. In certain other embodiments, the silica is present in an amount from about 0.1 to about 10 wt. % of the tinting composition.

In some other embodiments, an emulsifier is added to the tinting composition to aide in holding the components of the tinting composition into solution, to thicken the suspension of the tinting composition, and to serve as a dispersant for the pigment. It is desired to use an emulsifier in the tinting composition where the solvent is water in order to thicken the suspension of the tinting composition. Suitable emulsifiers include, but are not limited to, nonionic, cationic, anionic and amphoteric surfactants, block polymers, block copolymers, acrylics, primary and secondary emulsifiers, and mixtures thereof although other emulsifiers may also be used. The emulsifier that is selected for use in the tinting composition can be used either alone or in combination in varying proportions with other emulsifiers. Generally, an emulsifier is present in the tinting composition in an amount from about 0.001 to about 20 wt. % of the tinting composition. In certain embodiments, the emulsifier is present in an amount from about 0.1 to about 15 wt. % of the tinting composition.

In some embodiments, a fragrance is added to provide a scent to the tinting composition. Any fragrance known in the art which imparts the desired scent to the tinting composition can be used. The fragrance that is selected for use in the tinting composition can be used either alone or in combination in varying proportions with other fragrances. Generally, a fragrance is present in the tinting composition in an amount from about 0.0001 to about 15 wt. % of the tinting composition. In certain embodiments, the fragrance is present in an amount from about 0.01 to about 5 wt. % of the tinting composition.

In some other embodiments, an ultraviolet additive is added to protect the tinting composition from the sunlight. Examples of suitable ultraviolet additives include, but are not limited to, free radical scavengers, antioxidants, hindered amines, antistatic agents, and mixtures thereof although other ultraviolet additives may also be used. The ultraviolet additive that is selected for use in the tinting composition can be used either alone or in combination in varying proportions with other ultraviolet additives. Generally, an ultraviolet additive is present in the tinting composition in an amount from about 0.001 to about 10 wt. % of the tinting composition. In certain embodiments, the ultraviolet additive is present in an amount from about 0.01 to about 5 wt. % of the tinting composition.

As described above, a number of ingredients or components may be present in the tinting composition in accordance with embodiments of the invention. The following table shows the weight percentages for each component. It should be recognized that these ranges are merely preferences and that not all listed components need to be present in the tinting composition. A composition falling outside the preferred ranges is still within the scope of the invention described and claimed herein. The weight percentages are based on the total weight of the tinting composition. It should be recognized that the ingredients or components of the tinting composition can be added in any order to prepare the tinting composition.

TABLE 1

| Component | Range (wt. %) | Preferred Range (wt. %) |
| --- | --- | --- |
| Solvent | 0.1–99.9% | 50–99.9% |
| Pigment | 0.001–60% | 0.1–50% |
| Silica | 0.001–30% | 0.01–15% |
| Emulsifier | 0.001–20% | 0.1–15% |
| Fragrance | 0.0001–15% | 0.01–5% |
| Ultraviolet Additive | 0.001–10% | 0.01–5% |

The following examples are presented to illustrate various embodiments of the invention. All numerical values are approximate numbers. The specific details in each example should not be construed to limit the invention as otherwise described and claimed herein. The following tables show various tinting compositions made in accordance with embodiments of the invention. In each of the examples below, component 1 was mixed. While mixing, components 2 and 3 were added to component 1 and mixed until uniform. When uniform, components 4, 5, and 6 were added. The resulting composition was then mixed until uniform. All mixing was conducted at room temperature. The amount of each component added to each tinting composition is provided in weight percent of the total composition.

TABLE 2

TINTING COMPOSITION A

| COMPONENT | COMPOUND | WEIGHT % |
|---|---|---|
| 1 | Shell Sol 71 | 40.00% |
| 2 | Polydimethylsiloxane mixture [55.6% 50 cst polydimethylsiloxane, 33.3% 100,000 cst polydimethylsiloxane, and 11.1% 8,000,000–12,000,000 cst polydimethylsiloxane] | 37.00% |
| 3 | Aerosil ® R202 | 1.50% |
| 4 | Shell Sol 71 | 20.40% |
| 5 | Mearlin ® Hi-Lite Sparkle Green | 1.00% |
| 6 | Strawberry CE-49618 made by Custom Essence | 0.10% |

TABLE 3

TINTING COMPOSITION B

| COMPONENT | COMPOUND | WEIGHT % |
|---|---|---|
| 1 | Shell Sol 71 | 40.00% |
| 2 | Polydimethylsiloxane mixture [55.6% 50 cst polydimethylsiloxane, 33.3% 100,000 cst polydimethylsiloxane, and 11.1% 8,000,000–12,000,000 cst polydimethylsiloxane] | 37.00% |
| 3 | Aerosil ® R202 | 1.50% |
| 4 | Shell Sol 71 | 20.40% |
| 5 | Mearlin ® Hi-Lite Sparkle Blue | 1.00% |
| 6 | Strawberry CE-49618 made by Custom Essence | 0.10% |

TABLE 4

TINTING COMPOSITION C

| COMPONENT | COMPOUND | WEIGHT % |
|---|---|---|
| 1 | Shell Sol 71 | 40.00% |
| 2 | Polydimethylsiloxane mixture [55.6% 50 cst polydimethylsiloxane, 33.3% 100,000 cst polydimethylsiloxane, and 11.1% 8,000,000–12,000,000 cst polydimethylsiloxane] | 37.00% |
| 3 | Aerosil ® R202 | 1.50% |
| 4 | Shell Sol 71 | 20.40% |
| 5 | Mearlin ® Sparkle Russet | 1.00% |
| 6 | Strawberry CE-49618 made by Custom Essence | 0.10% |

TABLE 5

TINTING COMPOSITION D

| COMPONENT | COMPOUND | WEIGHT % |
|---|---|---|
| 1 | Shell Sol 71 | 40.00% |
| 2 | Polydimethylsiloxane mixture [55.6% 50 cst polydimethylsiloxane, 33.3% 100,000 cst polydimethylsiloxane, and 11.1% 8,000,000–12,000,000 cst polydimethylsiloxane] | 37.00% |
| 3 | Aerosil ® R202 | 1.50% |
| 4 | Shell Sol 71 | 20.40% |
| 5 | Exterior Mearlin ® Sparkle | 1.00% |
| 6 | Strawberry CE-49618 made by Custom Essence | 0.10% |

Tinting compositions A, B, C, and D were tested for odor, color, specific gravity, percent non-volatile material and viscosity, the results of which are presented below in Table E. The viscosity was measured using a Brookfield viscometer.

TABLE E

| TEST | TINTING COMPOSITION A | TINTING COMPOSITION B | TINTING COMPOSITION C | TINTING COMPOSITION D |
|---|---|---|---|---|
| Odor | Strawberry | Strawberry | Strawberry | Strawberry |
| Color | White with green sparkle | White with blue sparkle | Red sparkle | Silver sparkle |
| Specific Gravity | 0.835 | 0.835 | 0.835 | 0.835 |
| Percent Non-Volatile Material | 39% | 39% | 39% | 39% |
| Viscosity | 330–1600 centipoise (cPs) (spindle 3 @ 30 rpm) | 330–1600 centipoise (cPs) (spindle 3 @ 30 rpm) | 330–1600 centipoise (cPs) (spindle 3 @ 30 rpm) | 330–1600 centipoise (cPs) (spindle 3 @ 30 rpm) |

While the invention has been described with respect to a number of limited embodiments, variations and modifications exist. For example, although the invention is described with reference to vehicles, the application of the invention is not limited only to use on vehicles. Additional objects on which the tinting composition may be used include, but are not limited to, bicycles, motorcycles, campers, motor homes, recreational vehicles, trucks, roller blades, boats, and canoes. Also, other surfaces described herein can be tinted regardless of whether the surface is in or on a vehicle or other objects specifically referenced. The appended claims intend to cover all such variations and modifications as falling within the scope of the invention as described herein.

What is claimed is:

1. A tinting composition for tinting a surface comprising:

hydrocarbon solvent comprising about 75 wt. % of the tinting compound;

silicone fluid comprising about 22.5 wt. % of the tinting compound;

pigment selected from the group consisting of titanium dioxide, mica, and mixtures thereof, the pigment comprising about 2.5 wt. % of the tinting compound;

in emulsifier selected from the group consisting of nonionic, cationic, anionic and amphoteric surfactants, block polymers, block copolymers, acrylics, primary and secondary emulsifiers, and mixtures thereof, the emulsifier comprising at least 0.1 wt. % of the tinting composition;

a compound selected from the group consisting of fumed silica, amide powder, rheology additives, clays, surfactants, cellulose gums, carbomers, precipitated silica, and mixtures thereof at least 0.01 wt. % of the tinting composition;

fragrance; and an ultraviolet additive.

2. The tinting composition of claim 1, the fragrance comprising at least 0 001 wt. % of the tinting composition.

3. The tinting composition of claim 1, the ultraviolet additive comprising at least 0.001 wt. % of the tinting composition.

4. The tinting composition of claim 1, wherein the silicone fluid is polydimethylsiloxane and has a viscosity ranging from about 0.65 cst to about 12,000,000 cst.

* * * * *

UNITED STATES PATENT AND TRADEMARK OFFICE
CERTIFICATE OF CORRECTION

PATENT NO. : 6,489,393 B1
DATED : December 3, 2002
INVENTOR(S) : Sitabkhan et al.

It is certified that error appears in the above-identified patent and that said Letters Patent is hereby corrected as shown below:

<u>Column 8,</u>
Line 61, delete "in" and insert -- an --.

<u>Column 9,</u>
Line 9, delete "0 001" and insert -- 0.01 --.

Signed and Sealed this

Twenty-ninth Day of July, 2003

JAMES E. ROGAN
*Director of the United States Patent and Trademark Office*